(12) United States Patent
Oppitz et al.

(10) Patent No.: US 8,468,233 B1
(45) Date of Patent: Jun. 18, 2013

(54) SERVICE PROCESS INTEGRATION SYSTEMS AND METHODS

(75) Inventors: Marcus Oppitz, Klosterneuburg (AT); Piotr Klimkiewicz, Vienna (AT); Thomas Graf, Vienna (AT)

(73) Assignee: SolveDirect Service Management GmbH, Vienna (AT)

(*) Notice: Subject to any disclaimer, the term of this patent is extended or adjusted under 35 U.S.C. 154(b) by 0 days.

(21) Appl. No.: 13/617,386

(22) Filed: Sep. 14, 2012

(51) Int. Cl.
*G06F 15/173* (2006.01)
*G06F 9/44* (2006.01)

(52) U.S. Cl.
USPC .......................... 709/223; 717/107

(58) Field of Classification Search
USPC .......................................... 709/223
See application file for complete search history.

(56) References Cited

U.S. PATENT DOCUMENTS

| | | | |
|---|---|---|---|
| 7,370,335 B1 | 5/2008 | White | |
| 7,761,591 B2* | 7/2010 | Graham | 709/233 |
| 8,136,099 B2 | 3/2012 | Haller | |
| 2009/0158237 A1* | 6/2009 | Zhang et al. | 717/100 |
| 2011/0209162 A1 | 8/2011 | Machiraju | |
| 2011/0246340 A1 | 10/2011 | Dahod | |
| 2012/0023508 A1* | 1/2012 | Flores et al. | 719/328 |

OTHER PUBLICATIONS

Pezzini et al., "Integration Platform as a Service: Moving Integration to the Cloud," Gartner RAS Core Research Note G00210747, p. 1-9, Gartner, Inc., Stamford, CT; Mar. 7, 2011.

Mulesoft, "iPaaS: Integration for the Cloud Era," www.mulesoft.com/ipaas-integration-platform-as-a-service, p. 1-4, Mulesoft, Inc., San Francisco, CA; downloaded Apr. 4, 2012.

Soomro et al., "Challenges and Future of Enterprise Application Integration," International Journal of Computer Applications, 42(7): 42-45, New York, NY; Mar. 2012.

Solvedirect, "A Service 'Bridge' for Systems," http://www.solvedirect.com/jart/prj3/solve_direct/main.jart?rel=en&j-dummy=active&content-id=1236865493335&ndid=1295202198152&reserve-mode=active, p. 1-2, SolveDirect Service Management GmbH, Vienna Austria; Jan. 17, 2012.

* cited by examiner

*Primary Examiner* — Asghar Bilgrami
(74) *Attorney, Agent, or Firm* — Law Offices of Andrei D Popovici, PC

(57) ABSTRACT

In some embodiments, multiple heterogeneous information technology service management (ITSM) applications of different IT service partners (customers and service providers) are integrated via a service process integration grid employing a set of standard workflows and associated standard transaction types and data structures. Once a service partner's workflows and data structures have been mapped to the standard grid workflows and data structures, integration with a first and new service partners is relatively fast and convenient. Analysis of real-life ITSM applications led to the development of particular standardized workflows classified according to whether they are initiated by service provider or customer, and according to whether they do or do not include ownership-transfer transactions allowing a service partner (customer or provider) to transfer ownership of the service process to its counterpart for further action by the counterpart.

21 Claims, 15 Drawing Sheets

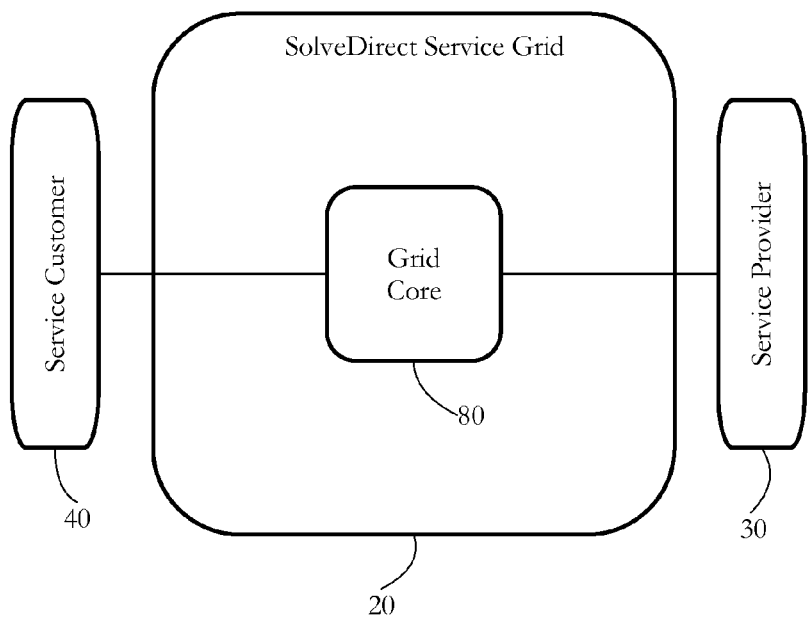
FIG. 4-A
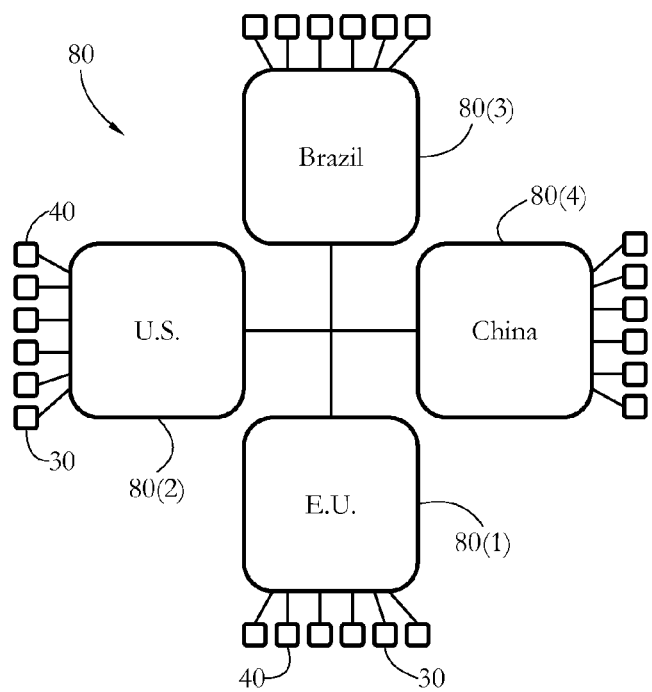
FIG. 4-B

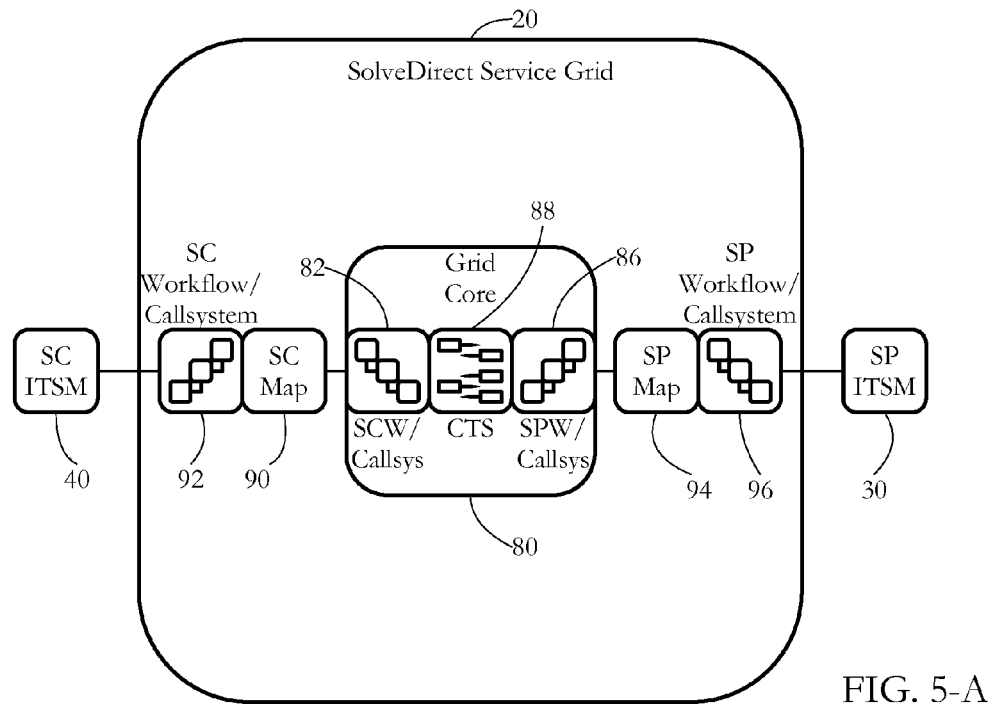
FIG. 5-A
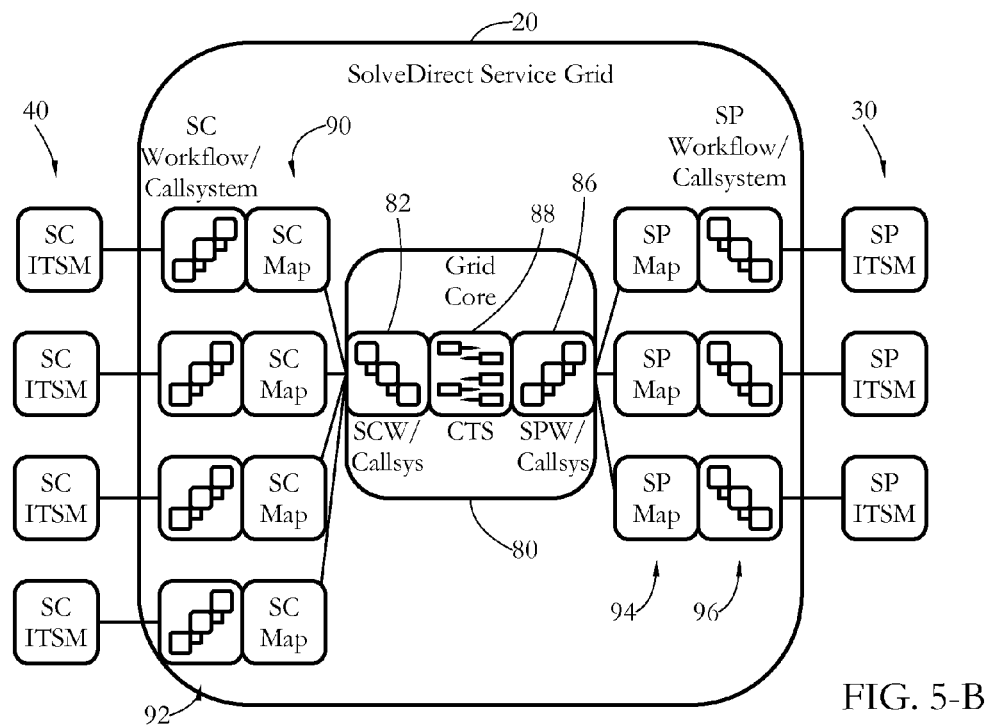
FIG. 5-B

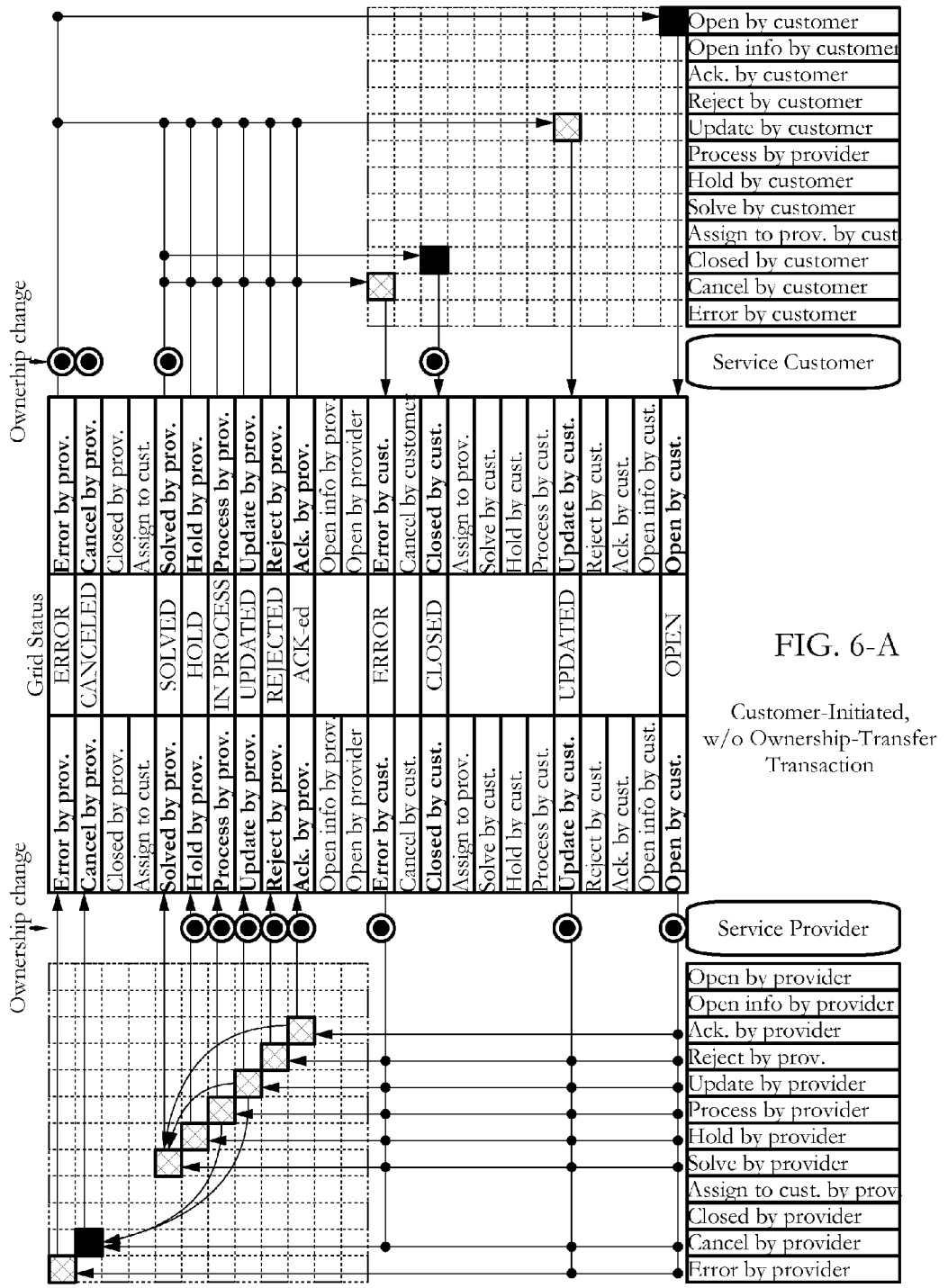
FIG. 6-A
Customer-Initiated,
w/o Ownership-Transfer
Transaction

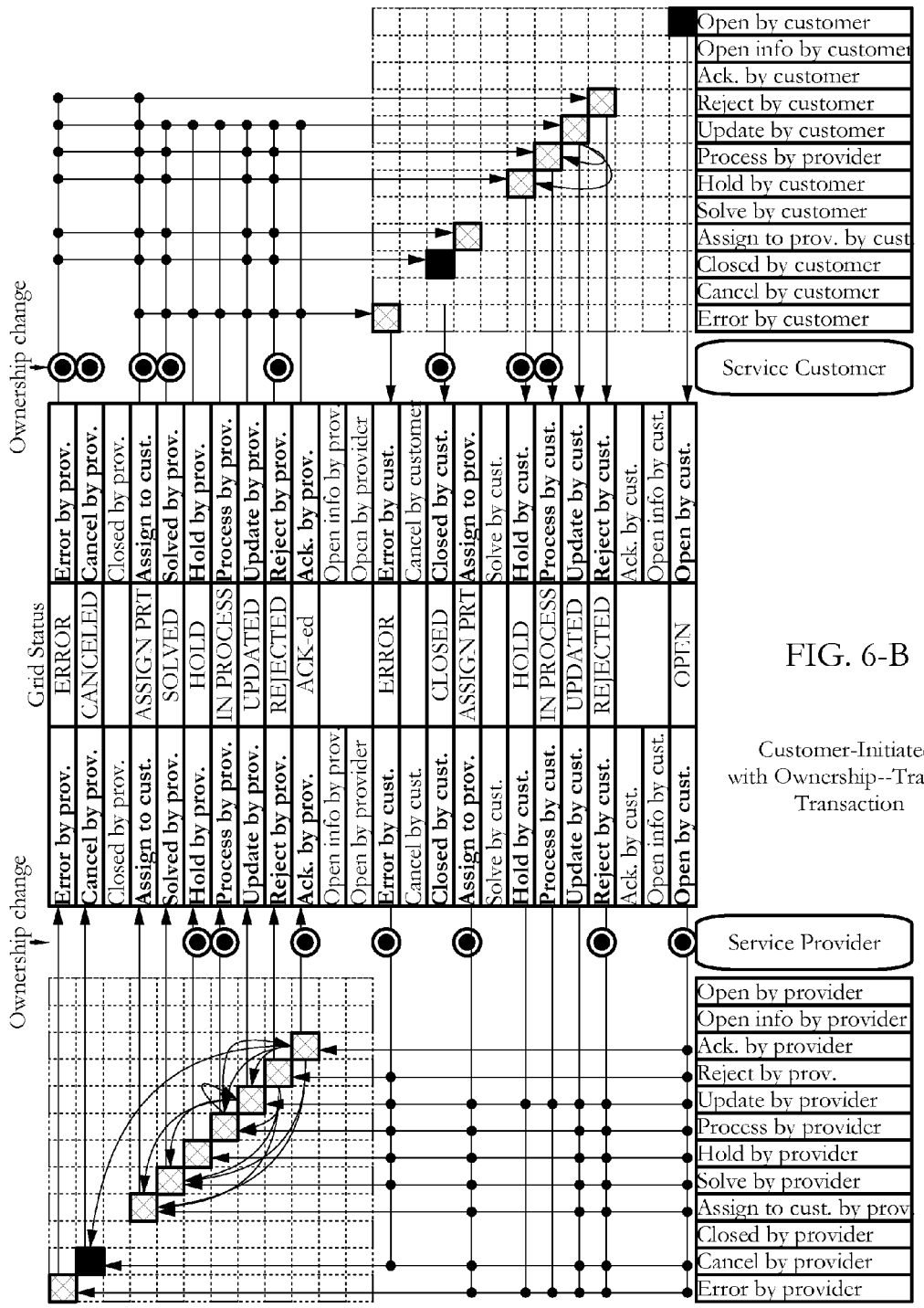
FIG. 6-B
Customer-Initiated, with Ownership--Transfer Transaction

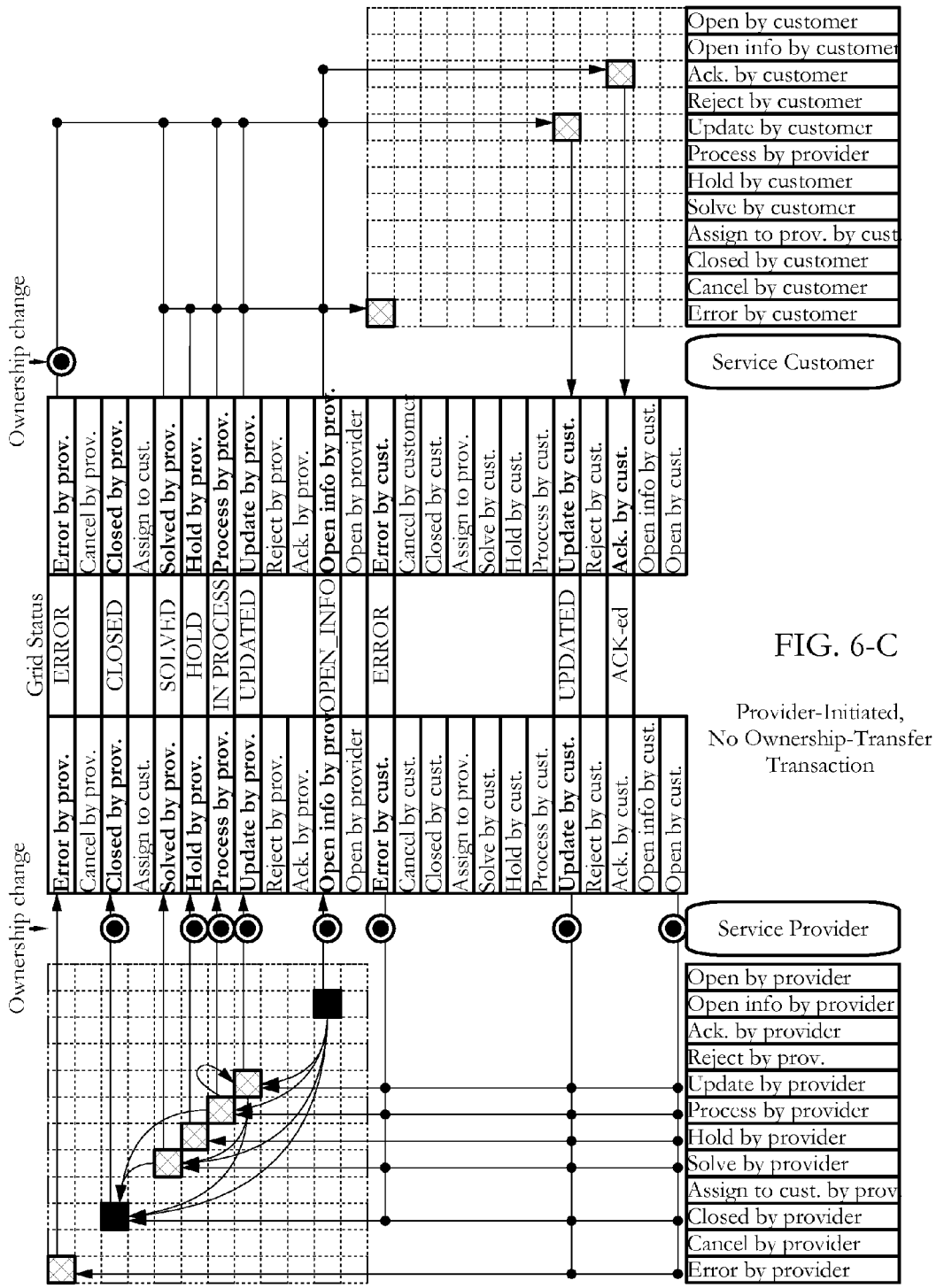
FIG. 6-C
Provider-Initiated,
No Ownership-Transfer
Transaction

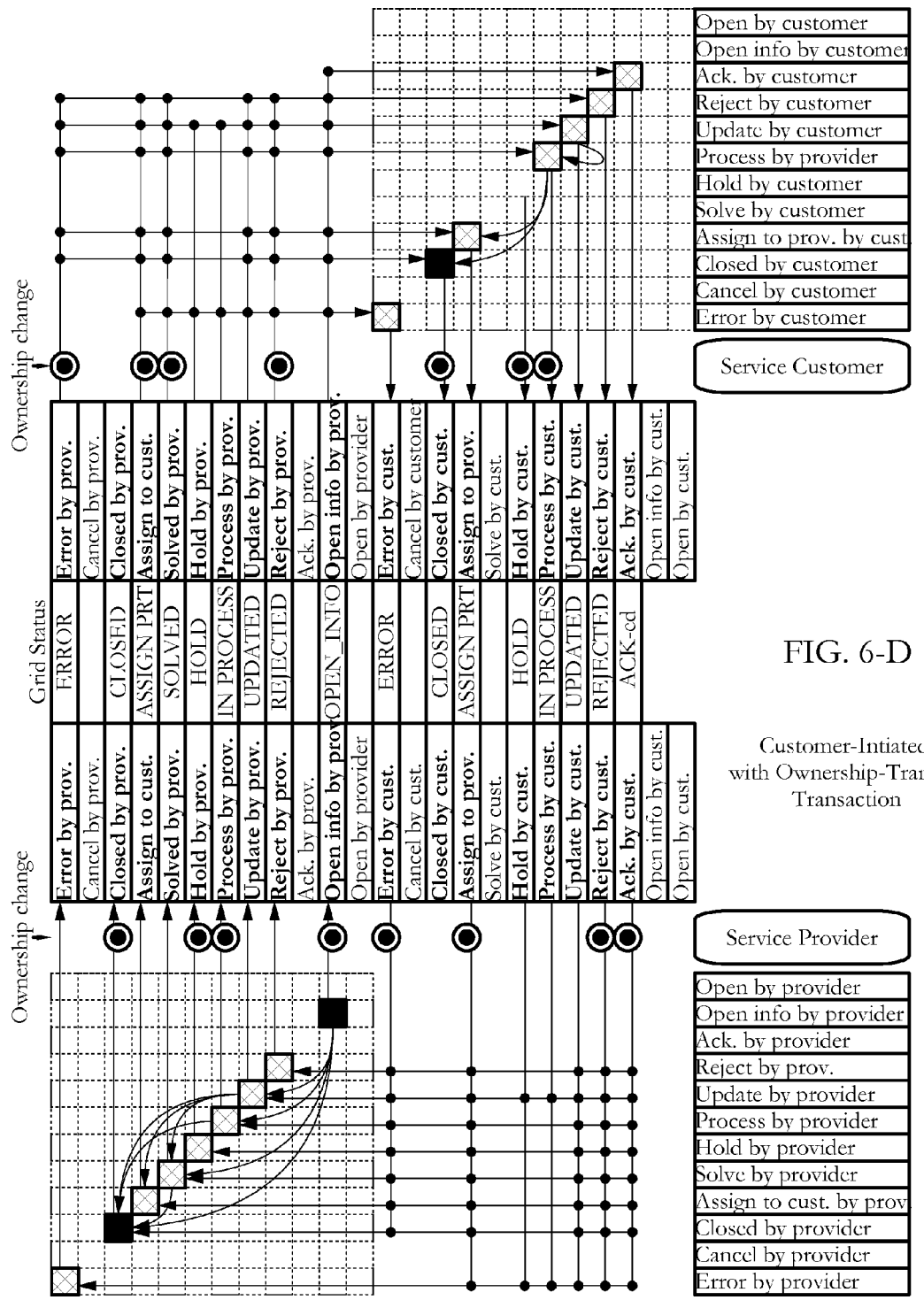
FIG. 6-D
Customer-Initiated, with Ownership-Transfer Transaction

| | | OPEN, OPEN_INFO | OPEN, OPEN_INFO | ACK, REJECT, UPDATE, PROCESS HOLD, SOLVE ERROR ASSIGN_PART. | ACK, REJECT, UPDATE, PROCESS HOLD, SOLVE ERROR ASSIGN_PART. | CANCEL, CLOSE | CANCEL, CLOSE |
|---|---|---|---|---|---|---|---|

M=mandatory, O=optional

| Data Group | Field | Description | Open by Cust | Open by Prov | Update by Cust | Update by Prov | Close by Cust | Close by Prov |
|---|---|---|---|---|---|---|---|---|
| Identification | CustCallID | Customer call ID code or number | M | | | | | |
| | ProvCallID | Provider call ID code or number | | M | M | M | M | M |
| | SDCallID | Internal service grid provider (SGP) Call ID | | M | M | M | M | M |
| Text | Description | Original description of problem when service case is opened | M | | | | | |
| | Remarks | Optional remark text when service case is updated | O | O | M | M | M | M |
| | Solution | Solution given to service case | O | O | O | O | O | O |
| Service Contract | Cont. Short Name | Contract ID for correct routing on SGP platform | M | M | M | M | M | M |
| | Cont. Elem. Short Name | Contract element ID for routing on SGP | M | M | | | | |
| Status | Status | Call status code | M | M | M | M | M | M |
| Prioritization | Priority | Priority code given by customer | M | O | | | | |

Transaction Types

FIG. 7-A

| Data Group | Field | Description | Open by Cust | Open by Prov | Update by Cust | Update by Prov | Close by Cust | Close by Prov |
|---|---|---|---|---|---|---|---|---|
| Identification | CustCallID | Customer call ID code or number | M | | | | | |
| | ProvCallID | Provider call ID code or number | | M | M | M | M | M |
| | SDCallID | Internal service grid provider (SGP) Call ID | | M | M | M | M | M |
| Text | Description | Original description of problem when service case is opened | M | M | | | | |
| | Remarks | Optional remark text when service case is updated | O | O | M | M | M | M |
| | Solution | Solution given to service case | O | O | O | O | O | O |
| Helpdesk Agent | Last name | Last name of helpdesk agent | M | O | | | | |
| | First name | First name of helpdesk agent | O | O | | | | |
| | Email | Email address of helpdesk agent | M | O | | | | |
| | Tel | Telephone number of helpdesk agent | O | O | | | | |
| End User (Caller) | Last name | Last name of end user | O | O | | | | |
| | First name | First name of end user | O | O | | | | |
| | Email | Email address of end user | O | O | | | | |
| | Tel | Telephone number of end user | O | O | | | | |
| Service Contract | Cont. Short Name | Contract ID for correct routing on SGP platform | M | M | M | M | M | M |
| | Cont. Elem. Short Name | Contract element ID for routing on SGP | M | M | | | | |
| Status | Status | Call status code | M | M | M | M | M | M |
| Prioritization | Priority | Priority code given by customer | M | O | | | | |
| | Severity | Severity code given by customer | O | O | | | | |
| Contact Person | Last name | Last name of contact person | | O | | | | |
| | First name | First name of contact person | | M | | | | |
| | Email | Email address of contact person | | O | | | | |
| | Tel | Telephone number of contact person | | O | | | | |

M=mandatory, O=optional — Transaction Types

FIG. 7-B

FIG. 7-C    M=mandatory, O=optional

| Data Group | Field | Description | Open by Cust | Open by Prov | Update by Cust | Update by Prov | Close by Cust | Close by Prov |
|---|---|---|---|---|---|---|---|---|
| Identification | CustCallID | Customer call ID code or number | M | | | | | |
| | ProvCallID | Provider call ID code or number | | M | M | M | M | M |
| | SDCallID | Internal service grid provider (SGP) Call ID | | | M | M | M | M |
| Text | Description | Original description of problem when service case is opened | M | M | | | | |
| | Remarks | Optional remark text when service case is updated | O | O | M | M | M | M |
| | Solution | Solution given to service case | O | O | O | O | O | O |
| Helpdesk Agent | Last name | Last name of helpdesk agent | M | O | | | | |
| | First name | First name of helpdesk agent | O | O | | | | |
| | Email | Email address of helpdesk agent | M | O | | | | |
| | Tel | Telephone number of helpdesk agent | O | O | | | | |
| End User (Caller) | Last name | Last name of end user | O | O | | | | |
| | First name | First name of end user | O | O | | | | |
| | Email | Email address of end user | O | O | | | | |
| | Tel | Telephone number of end user | O | O | | | | |
| Component | Serial number | Serial number of the component | M | O | | | | |
| | Inventory number | Inventory number of the component | M | O | | | | |
| | Location | Location of component | O | O | | | | |
| Component Location | Country | Country of component location | O | O | | | | |
| | ZIP | ZIP code of component location | O | O | | | | |
| | City | City of component location | O | O | | | | |
| | Street address | Street addres of component location | O | O | | | | |
| Service Contract | Cont. Short Name | Contract ID for correct routing on SGP platform | M | M | | | | |
| | Cont. Elem. Short Name | Contract element ID for routing on SGP | M | M | | | | |
| Status | Status | Call status code | M | M | M | M | M | M |
| Prioritization | Priority | Priority code given by customer | M | O | | | | |
| | Severity | Severity code given by customer | O | O | | | | |
| Contact Person | Last name | Last name of contact person | | O | | | | |
| | First name | First name of contact person | | O | | | | |
| | Email | Email address of contact person | | M | | | | |
| | Tel | Telephone number of contact person | | O | | | | |

Transaction Types

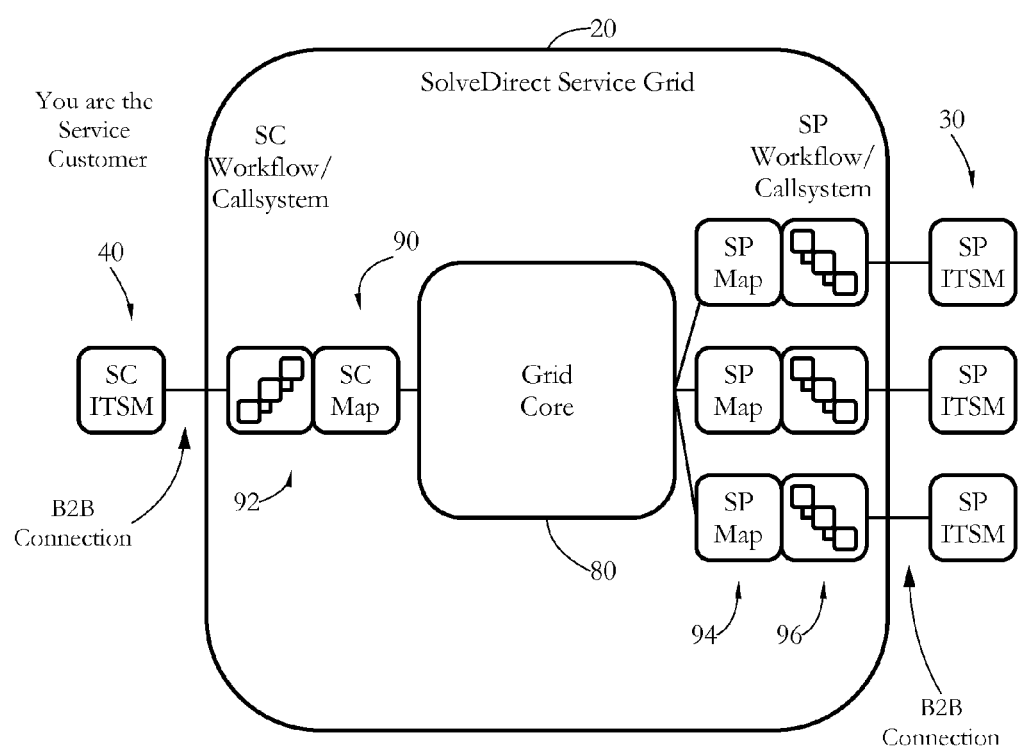
FIG. 8-A

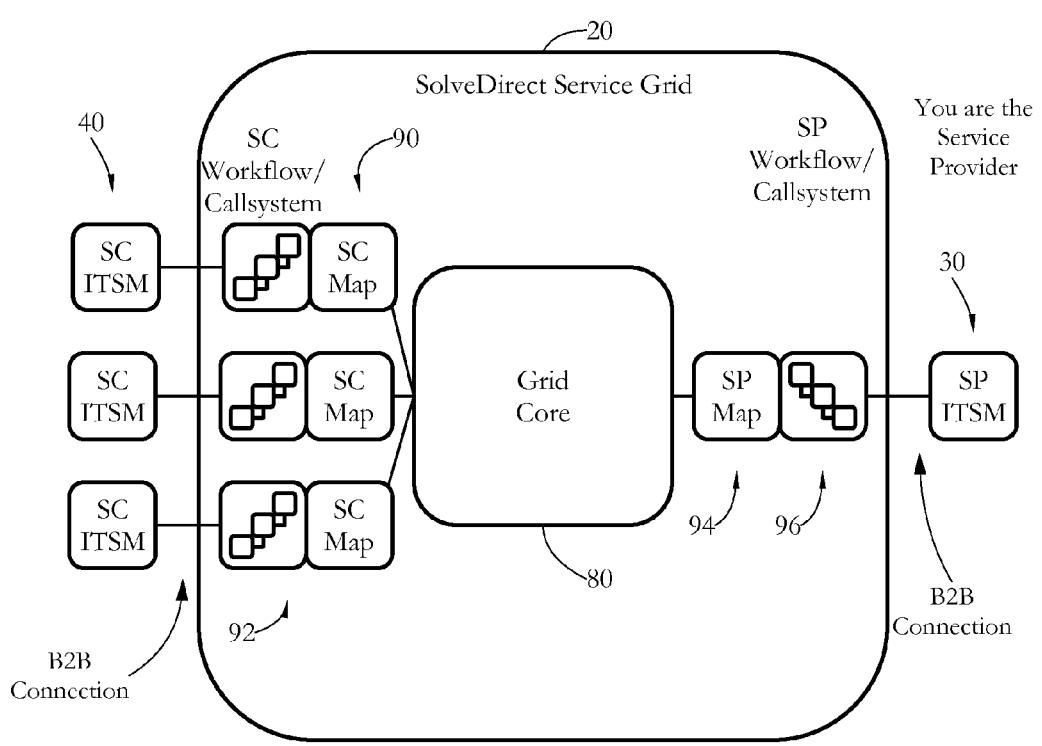
FIG. 8-B

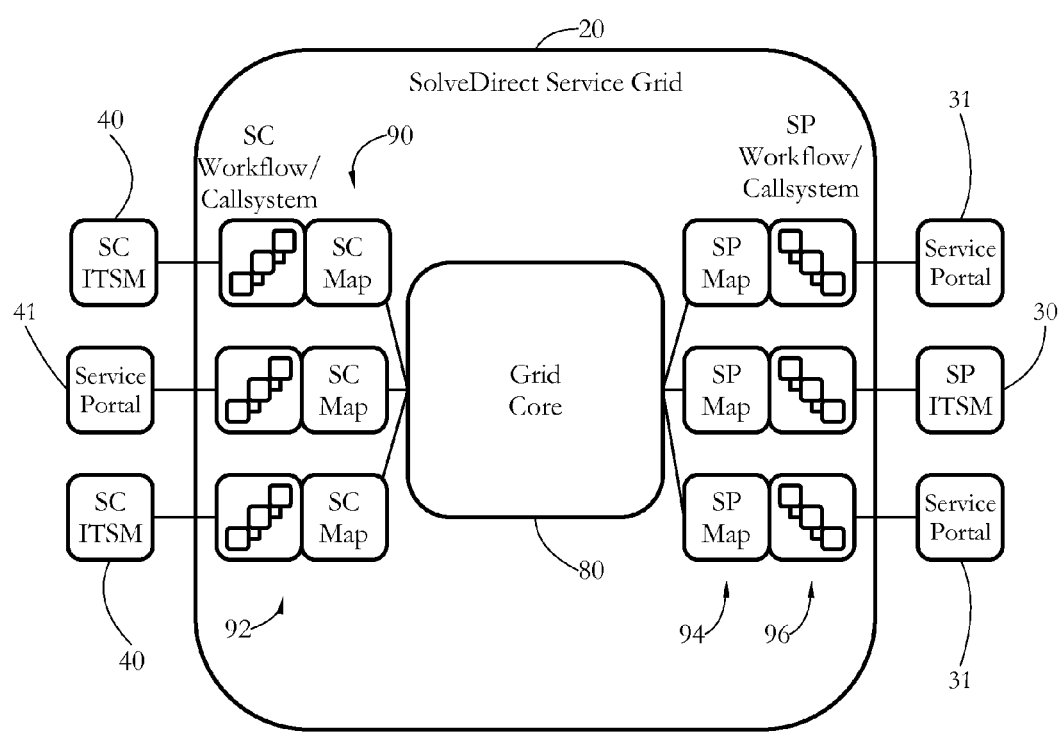
FIG. 8-C

SERVICE PROCESS INTEGRATION SYSTEMS AND METHODS

BACKGROUND

The invention relates to systems and methods for providing information technology (IT) services, and in particular to systems and methods for interconnecting IT service process provider and IT service process customer computer systems.

IT service processes such as incident management, problem management, and service request management processes normally involve interactions between service customers or requesters and service providers. For example, if an end user experiences an incident with an IT system operated by a service process customer (e.g. if the end user encounters an error or other difficulty accessing an email system operated by the service process customer), a service process provider may handle a response to the incident in order to resolve the end user's issue. Such a response may include communications with the end user, and the performance of a sequence of steps on the end user, service process customer, and service process provider systems. In outsourcing situations, service process interactions may occur across company and/or country boundaries. Interactions between different companies may require integrating service process customer and service process provider applications employing different transactions, workflows, and data structures. In some instances, conventional service process integration may require substantial numbers person-days of work for each customer-provider pair. In a business environment characterized by growing service outsourcing volume, the efficiency of establishing and operating service process integration is of growing importance.

SUMMARY

According to one aspect, a computer system includes at least one processor configured to execute instructions to form: a service process provider mapping layer configured to map a plurality of heterogeneous service process provider workflows of a plurality of service process provider information technology service management (ITSM) applications to a plurality of standard service process workflows of a service process integration grid, wherein each service process provider workflow is mapped to one standard service process workflow; a service process customer mapping layer configured to map a plurality of heterogeneous service process customer workflows of a plurality of service process customer ITSM applications to the plurality of standard service process workflows, wherein each service process customer workflow is mapped to one standard service process workflow; and a service process integration grid core coupling the service process provider mapping layer to the service process customer mapping layer, the service process integration grid core being configured to route service process workflow transactions between service process providers and corresponding service process customers, wherein the service process integration grid core couples each service process customer workflow to a corresponding service process provider workflow through a corresponding standard service process workflow.

According to another aspect, a computer-implemented method comprises employing at least one processor to execute instructions to: map a plurality of heterogeneous service process provider workflows of a plurality of service process provider information technology service management (ITSM) applications to a plurality of standard service process workflows of a service process integration grid, wherein each service process provider workflow is mapped to one standard service process workflow; map a plurality of heterogeneous service process customer workflows of a plurality of service process customer ITSM applications to the plurality of standard service process workflows, wherein each service process customer workflow is mapped to one standard service process workflow; and employ a service process integration grid core to route service process workflow transactions between service process providers and corresponding service process customers, wherein the service process integration grid core couples each service process customer workflow to a corresponding service process provider workflow through a corresponding standard service process workflow.

According to another aspect, a non-transitory computer-readable medium encodes instructions which, when executed by a computer system, cause the computer system to: map a plurality of heterogeneous service process provider workflows of a plurality of service process provider information technology service management (ITSM) applications to a plurality of standard service process workflows of a service process integration grid, wherein each service process provider workflow is mapped to one standard service process workflow; map a plurality of heterogeneous service process customer workflows of a plurality of service process customer ITSM applications to the plurality of standard service process workflows, wherein each service process customer workflow is mapped to one standard service process workflow; and employ a service process integration grid core to route service process workflow transactions between service process providers and corresponding service process customers, wherein the service process integration grid core couples each service process customer workflow to a corresponding service process provider workflow through a corresponding standard service process workflow.

BRIEF DESCRIPTION OF THE DRAWINGS

The foregoing aspects and advantages of the present invention will become better understood upon reading the following detailed description and upon reference to the drawings where:

FIG. 4-A shows a service process integration grid according to some embodiments of the present invention.

FIG. 4-B illustrates a geographically-distributed service process integration grid according to some embodiments of the present invention.

FIGS. 5-A and 5-B show the internal structure of a service process integration grid core connected to one customer and one provider (FIG. 5-A) or multiple customers and multiple providers (FIG. 5-B), according to some embodiments of the present invention.

FIG. 6-A illustrates an exemplary standard customer-initiated, no-ownership-change workflow according to some embodiments of the present invention.

FIG. 6-B illustrates an exemplary customer-initiated, ownership-change workflow according to some embodiments of the present invention.

FIG. 6-C illustrates an exemplary standard provider-initiated, no-ownership-change workflow according to some embodiments of the present invention.

FIG. 6-D illustrates an exemplary standard provider-initiated, ownership-change workflow according to some embodiments of the present invention.

FIG. 7-A shows an exemplary data map in a relatively simple embodiment illustrating transaction types used for proper case routing, according to some embodiments of the present invention.

FIG. 7-B shows an exemplary data map for a number of transaction types used for service request (case) management according to some embodiments of the present invention.

FIG. 7-C shows an exemplary data map for a number of transaction types used for incident management referencing a configuration item, according to some embodiments of the present invention.

FIG. 8-A illustrates an exemplary configuration in which one service process customer is connected to multiple service process customers, according to some embodiments of the present invention.

FIG. 8-B illustrates an exemplary configuration in which one service process provider is connected to multiple service process, according to some embodiments of the present invention.

FIG. 8-C illustrates an exemplary configuration in which multiple service process customers are connected to multiple service process providers, according to some embodiments of the present invention.

DETAILED DESCRIPTION OF PREFERRED EMBODIMENTS

Figure 1:
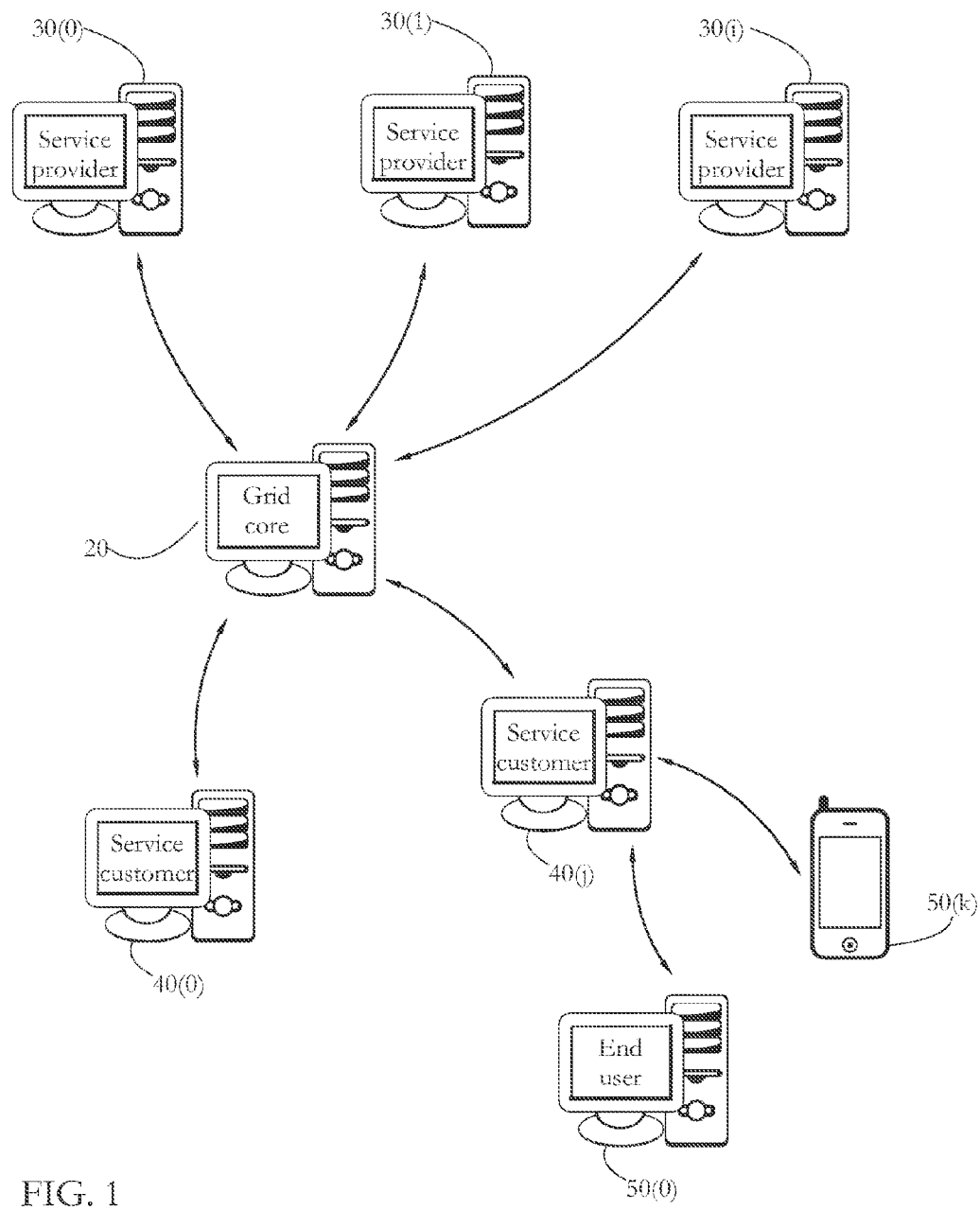
FIG. 1 shows a plurality of interconnected computer systems according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. An in-process ownership change is a controlled ownership change that occurs in the performance of a service process to allow service partners to alternate performing substantive actions, and not a process-boundary ownership change which may occur merely as an automatic consequence of starting or terminating a service process. Incident management refers to responding to an unplanned interruption to or reduction in the quality of an IT service, so as to return the IT service to normal operation. Problem management refers to responding to one or more incidents in order to remove the root causes of the incident(s), so as to prevent further incidents. Service request management (SRM) refers to managing a service catalog which lists IT services (e.g. email, storage, specialized applications, etc.) that an organization provides to its customers, employees, or other associates, to enable requests for the provision of IT services to be fulfilled. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors and associated memory) programmed to perform the methods described herein, as well as computer-readable media encoding instructions to perform the methods described herein.

The following description illustrates embodiments of the invention by way of example and not necessarily by way of limitation.

Service provider organizations face challenges in integrating their internal service process with the service processes of their customers. Large service providers have an opportunity to reduce costs and improve their service offering for up to hundreds of customers and partners through a tight integration of service processes. The implementation of service processes in organizations is commonly based on workflow definitions and the implementation of workflows in ITSM (Information Technology Service Management) applications. Due to the lack of standard workflows for service processes and different requirements of different organizations, such process implementations may follow best practice frameworks (e.g. as defined by ITIL, the Information Technology Infrastructure Library) but differ in interpretation and implementation. To integrate service processes between different organizations a complex and time-consuming workflow analysis is often executed before a workflow mapping can be customized on the central hub.

According to some embodiments of the present invention, a service process integration grid is used to facilitate the integration of multiple, heterogeneous computer systems of different service partners including vendors, managed service providers, and end customers. The service process integration grid includes a set of standard workflows, transaction types, and data structures. A service process customer workflow is integrated with a service process provider workflow by mapping the workflows and corresponding transaction types and data structures to a common standard workflow and associated standard transaction types and data structures defined by the service process integration grid. Once an original mapping has been established for a given service process provider, integration with subsequent process customer systems can be achieved with significantly less effort. Similar gains in efficiency are achieved by service process customers for integration with subsequent service process providers. The service process integration grid can be implemented as a set of distributed Integration-Platforms-as-a-Service (IPaaS), controlled via a centralized control center component. A central service may be made available through multiple platforms, each in a different geographically-distributed locations, in order to facilitate compliance with country- or region-specific requirements such as data security and privacy requirements.

FIG. 1 shows a network including a number of computer systems according to some embodiments of the present invention: a service process integration grid 20 connecting a plurality of service provider computer systems 30($i$), $i=0$ . . . I, to a plurality service process customer computer systems 40($j$), $j=0$ . . . J. Each customer computer system 40($j$) may be connected to multiple end-user computer systems 50($k$), $k=0$ . . . K. The connections illustrated in FIG. 1 may be implemented over a wide area network (a network including at least one router), such as the Internet. In some embodiments, the connections may be implemented using one or more transport protocols such as SMTP, HTTPS SOAP, HTTPS POST, SFTP, and/or others, and may be encrypted using protocols such as SSL, TLS, SFTP, and/or others. The exchanged content may use formats such as XML (as specified by grid 20 and/or service partners), name-value pair, or others. Each computer system illustrated in FIG. 1 may include one or more physical computer systems such as computer servers. In some embodiments, service process integration grid 20 may interconnect tens, hundreds or thousands of service provider computer systems 30(*i*) to tens, hundreds or thousands of customer computer systems 40(*j*). In some embodiments, service process integration grid 20 may be implemented via multiple distributed platforms, each located in a different country/jurisdiction (e.g. United States, Europe), and each including one or more physical computer systems.

Figure 2:
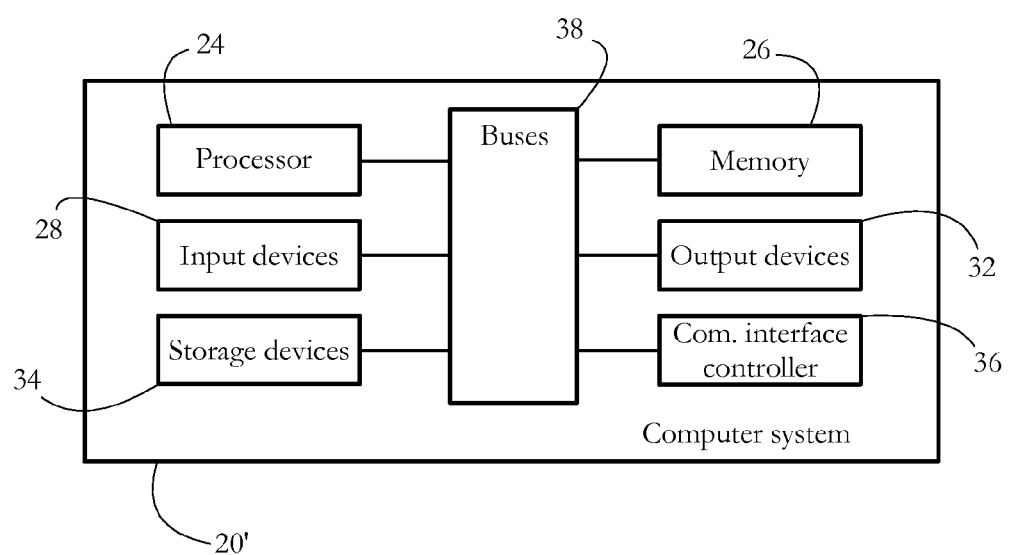
FIG. 2 illustrates hardware components of a computer system according to some embodiments of the present invention.

FIG. 2 shows a hardware configuration of an exemplary computer system 20' which may be used to implement at least part of service process integration grid 20 according to some embodiments of the present invention. Similar hardware configurations may be used for computer systems 30, 40, 50 shown in FIG. 1. As shown in FIG. 2, one or more buses 38 connect a microprocessor (CPU) 24, memory (e.g. DRAM) 26, input devices (e.g. mouse, keyboard) 28, output devices (e.g. display, speakers, haptic/vibration generator) 32, storage devices (e.g. hard drive, solid state drive) 34, and a communication interface controller (e.g. network interface card) 36.

In some embodiments, service process integration grid 20 implements a set of standard service process workflows, transaction types, and data structures, which are mapped to corresponding workflows, transaction types and data structures used by service process provider and service process customer systems. A number of such standard service process workflows, transaction types and data structures, identified at least in part by analyzing approximately 600 workflow mappings between more than 200 service partners, are described below.

Standard Workflow Types (Workflow Mapping Patterns)

Figure 3:
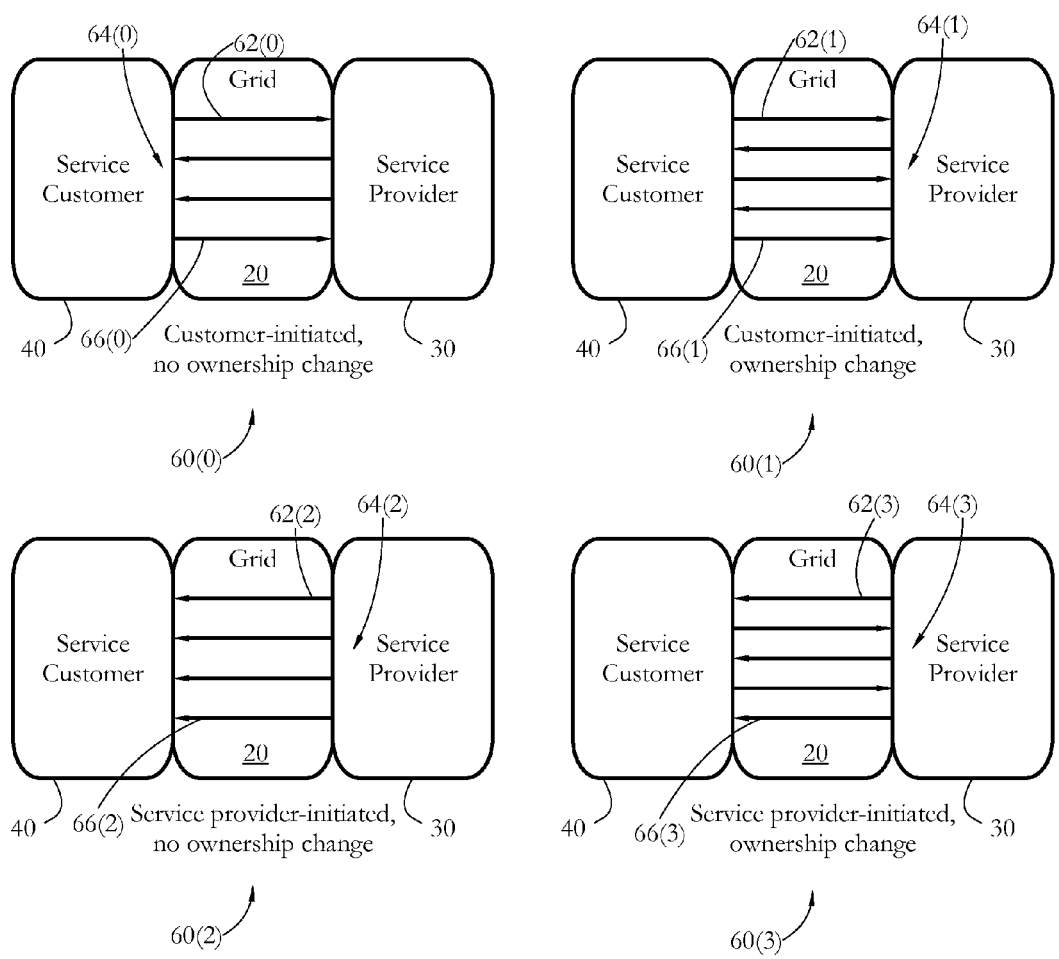
FIG. 3 shows four standard workflow types defined by a service process integration grid according to some embodiments of the present invention.

FIG. 3 shows four standard workflow types 60(0-4) defined by service process integration grid 20 according to some embodiments of the present invention. Each standard workflow type is a workflow mapping pattern, as described in more detail below. The four workflow types are defined according to whether the workflow is initiated by a service process provider customer or provider, and according to whether the workflow does or does not include an in-process ownership change. A workflow type supporting an in-process ownership change may be referred to below as an ownership-change workflow.

An in-process ownership change, i.e. an in-process ownership transfer between a service provider and corresponding service customer, occurs in response to a transfer-to-partner transaction (e.g. transfer to customer, transfer to provider), which allows the partner to perform certain actions needed to continue the process (e.g. plug in a router, turn on an application, perform a change in configuration settings in an IT system). An in-process or internal ownership change is distinct from a process-boundary ownership change that may occur automatically at a process boundary defined by an open, solve, cancel or error transaction, as described below with reference to FIGS. 6-A-D. In some embodiments, an in-process ownership change may lead to tolling of response periods tracked under service level agreements (SLAs) between service process provider and customer. For example, if a provider guarantees a 4-hour solution time for a particular type of problem, an in-process ownership transfer to the service customer so that the customer can perform particular actions may lead to pausing the SLA clock for the process until process ownership is returned to the provider.

In FIG. 3, the ordered arrows between service process provider 30 and service process customer 40 denote schematically the direction and sequence of communications through service process integration grid 20. A customer-initiated workflow 60(0) without an in-process ownership-change is initiated by a service process customer 40, as denoted by a service process initiation communication 62(0). In response, service process provider 30 performs a number of service process steps and keeps service process customer 40 informed through a number of intermediate communications 64(0). No ownership change/transfer from service process provider 30 to service process customer 40 occurs during the workflow, other than optionally automatic ownership changes associated with process-boundary transactions such as open, close, solve or error; after the case is initiated, the workflow steps until case closure are performed by service process provider 30, and the process does not wait for actions to be performed by service process customer 40 and/or an associated end-user. In response to determining that the service process case has been resolved, e.g. when a solution has been found by service process provider 30, service process customer 40 closes the case, as illustrated by the service process closing communication 66(0).

A customer-initiated workflow 60(1) supporting an in-process ownership-change is initiated by a service process customer 40, as denoted by a service process initiation communication 62(1). In response, a number of interactive steps are performed by service process provider 30 and service process customer 40, as illustrated by the intermediate communications 64(1). The performed steps involve transferring ownership of the case from service process provider 30 to service process customer 40, and/or from service process customer 40 to service process provider 30. When ownership of the case is transferred from service process provider 30 to service process customer 40, service process customer 40 must perform one or more steps (e.g. change system configuration, provide data) before the workflow proceeds. In response to determining that the service process case has been resolved, e.g. when a solution has been found by service process provider 30, service process customer 40 closes the case, as illustrated by the service process closing communication 66(1).

A service provider-initiated workflow 60(2) without an in-process ownership change is initiated by a service process provider 30, as denoted by a service process initiation communication 62(2). In response, service process provider 30 performs a number of service process steps and keeps service process customer 40 informed through a number of intermediate communications 64(2). No ownership change/transfer from service process provider 30 to service process customer 40 occurs during the workflow; after the case is initiated, all steps until case closure are performed by service process provider 30, and the process does not wait for actions to be performed by service process customer 40 and/or an associated end-user. In response to determining that the service process case has been resolved, e.g. when a solution has been found by service process provider 30, service process provider 30 closes the case, as illustrated by the service process closing communication 66(2).

A service provider-initiated workflow 60(3) supporting an in-process ownership change is initiated by a service process provider 40, as denoted by a service process initiation communication 62(3). In response, a number of interactive steps are performed by service process provider 30 and service process customer 40, as illustrated by the intermediate communications 64(3). The performed steps involve transferring ownership of the case from service process provider 30 to service process customer 40, and/or from service process customer 40 to service process provider 30. When ownership of the case is transferred from service process provider 30 to service process customer 40, service process customer 40 must perform one or more steps (e.g. change system configuration, provide data) before the workflow proceeds. In response to determining that the service process case has been resolved, e.g. when a solution has been found by service process provider 30, service process provider 30 closes the case, as illustrated by the service process closing communication 66(3).

Standard Transaction Types

In some embodiments, a set of standard transaction types are defined by service process integration grid 20, and are mapped to heterogeneous service process provider and service process customer data types. Such transactions may be represented as XML documents in some embodiments. Table 1 shows a set of 24 (2×12) standard transaction types defined according to some embodiments of the present invention, and associated descriptions for the transactions. The standard transaction types cover each of the standard workflow types described above. The standard in-process controlled ownership change transactions, denotes below as ASSIGN PARTNER, are shown in bold in Table 1.

TABLE 1

| Direction | Grid Transaction | Description (use case) |
|---|---|---|
| ⇢ | OPEN | opens a ticket at the partner side and moves responsibility to partner |
| ⇢ | OPEN_INFO | opens a ticket at the partner side for information, responsibility stays with sender |
| ⇢ | ACKNOWLEDGE | acknowledges an OPEN request |
| ⇢ | REJECT | rejects an OPEN, or ASSIGN_PARTNER request |
| ⇢ | UPDATE | updates a ticket without changing the status |
| ⇢ | PROCESS | updates a ticket and declares that the sender is working on the case |
| ⇢ | HOLD | updates a ticket and declares that the service level is set to hold |
| ⇢ | SOLVE | updates a ticket and declares that a solution was provided and the task is completed |
| ⇢ | ASSIGN_PARTNER | assigns the ticket to the partner and moves responsibility to partner |
| ⇢ | CLOSE | closes a ticket finally |
| ⇢ | CANCEL | aborts a ticket, ticket will be closed finally |
| ⇢ | ERROR | sets the ticket to error state because of an illegal transaction |
| ⇠ | OPEN | opens a ticket at the partner side and moves responsibility to partner |
| ⇠ | OPEN_INFO | opens a ticket at the partner side for information, responsibility stays with sender |
| ⇠ | ACKNOWLEDGE | acknowledges an OPEN request |
| ⇠ | REJECT | rejects an OPEN, or ASSGIN_PARTNER request |
| ⇠ | UPDATE | updates a ticket without changing the status |
| ⇠ | PROCESS | updates a ticket and declares that the sender is working on the case |
| ⇠ | HOLD | updates a ticket and declares that the service level is set to hold |
| ⇠ | SOLVE | updates a ticket and declares that a solution was provided and the task is completed |
| ⇠ | ASSIGN_PARTNER | assigns the ticket to the partner and moves responsibility to partner |
| ⇠ | CLOSE | closes a ticket finally |
| ⇠ | CANCEL | aborts a ticket, ticket will be closed finally |
| ⇠ | ERROR | sets the ticket to error state because of an illegal transaction |

In some embodiments, all transactions form service process grid 20 to a service partner (provider or customer) are mandatorily mapped on the service partner side. If a service partner does not use a standard transaction defined by service process grid 20, a not-applicable (NA) transaction status may be defined and mapped (with a direction service process grid-to-partner) for that transaction.

If a service partner uses more than one flavour/type of a standard transaction, in some embodiments one of the service partner transactions is selected and mapped to the standard transaction. In some embodiments, partner-specific logic uses one or more data fields within the transaction to implement more specific, field-dependent mappings. For example, if a service partner is able to distinguish between three levels of "In Process," such partner-specific logic maps the standard transaction "PROCESS" to one of the three partner transactions "In Process Level 1," "In Process Level 2," and "In Process Level 3" according to a value in a field "Level" associated with the transaction. Such partner-specific logic may be implemented within grid 20, between a grid core (described below, shown at 80 in FIG. 4-A) and the partner interface, to form part of a partner-specific grid connection. Grid core 80 remains a standard, partner-independent component. In some embodiments, such partner-specific logic may be implemented using Extensible Stylesheet Language Transformations (XSLT) code in an encapsulated environment that does not change other code within grid 20. XSLT is a declarative, XML-based language used for the transformation of XML documents. Partner-specific XSLT code receives an input XML document (transaction) and outputs a result document (transaction) in XML or other format.

Standard Data Structures

In some embodiments, service process grid 20 defines a set of standard data structures, including required data fields and/or optional data fields, for each standard transaction type. The standard data structures allow a service partner to define its process and workflow capabilities and requirements in a clear, standardized manner, allowing easy processing by other service partners.

In some embodiments, a standard data map includes a number of fields organized in a set of field groups described in Table. 2. In exemplary embodiments, the field groups listed in Table 2 include about 320 standard fields.

TABLE 2

| Field Group | Description |
|---|---|
| Identification | The identification data fields are user for the unique identification of the service case on both sides (service customer and service provider) and on the service process integration platform. |

TABLE 2-continued

| Field Group | Description |
| --- | --- |
| Service Contract | The service contract identification is used for a proper routing of the service case from the service customer to the service provider. It may be required in the first (open) transaction, and subsequent transactions are automatically routed using the unique service case IDs. Service contract data and contract element date may also be used to define the service level in terms of response and recovery time committed. |
| Text | The text data is the description of a service case. It consists in nearly all cases of the initial text description and the text remarks for each status update. Additionally fields for solution descriptions are available. |
| Status | The status is used to distinguish between the different transaction types. Each partner in the service process may have different status codes. The status codes are mapped on the service process integration platform. |
| Time Stamps | There are number of timestamps available to be used or documentation of the open time, acknowledge time, response time, recovery time and close time of a service case. |
| Priority, Severity | Priority and Severity may be used. These codes are mapped on the service process integration platform between the service customer codes used and the service provider codes. |
| Category | A number of codes for categorization of the service case are available |
| Help Desk Agent | Name and contact data of the help desk agent |
| Caller (End User) | Name and contact data of the end user |
| Contact Person | Name and contact data of the person to be contacted |
| Component | Serial number, inventory number and attributes of the component |
| Location | Coordinates of the location |

Service Process Integration Grid and Grid Core

In some embodiments, each jurisdiction-specific platform of service process grid 20 includes a service process grid core 80, shown in FIG. 4. Grid core 80 is a standard component that provides to each service partner a well-defined standard workflow definition to be used for mapping to other service partners' workflows. Once a workflow of a service partner is connected to a standard workflow of grid core 80, first and additional connections to other service partners' workflows can be activated without additional process and workflow mapping discussions. Two service partners are thus able to connect quickly and conveniently if their workflow definitions are mapped to the same standard service process workflow.

FIG. 4-B illustrates an integration grid 80 including multiple, geographically-distributed grid platforms 80(0)-80(7) located in different countries/regions subject to different data security and/or privacy regulations. For example, one or more platforms may be located in a data center in the United States, while others may be located in data centers in Europe and/or Asian countries. Service partners (customers 40 and/or providers 30), and in particular service process customers 40 in a particular jurisdiction are connected directly to the corresponding platform in that jurisdiction. Each service partner owns and administers a number of customer-specific data fields on the corresponding platform. The data exchanged between platforms in different jurisdictions is service case transaction data, which contains only information needed to escalate or update a service case between partners. Customer-specific private data such as user data, contract data, device data, location data, and permissions are not exchanged between platforms. Employing distributed platforms allows reducing the exchange of partner-specific private data across jurisdiction boundaries.

In some embodiments, a platform may be operated as a public cloud by a service process integration provider serving multiple customers and/or providers. In some embodiments, a platform may be operated as a private cloud by a service partner within its own premises. In some embodiments, different platforms are connected to each other through a service grid control center, a centralized hub that provides to platforms data about partners and connections to each of the platforms.

FIGS. 5-A and 5-B show an exemplary internal structure of grid core 80 according to some embodiments of the present invention. Grid core 80 includes a customer-side standard workflow callsystem 82 for service customers, a provider-side workflow callsystem 86 for service providers, and a core transaction system (CTS) 88 responsible for mapping and routing call transactions between corresponding partners connected to grid core 80. FIG. 5-A illustrates a grid connection to a single service customer and service provider, while FIG. 5-B illustrates a grid connection to multiple service customers and multiple service providers.

Each standard workflow callsystem 82, 86 generates an identified standard workflow or workflow data in response to received calls. Core transaction system 88 routes received standard transactions and associated standard data structures to the appropriate recipients, and verifies that received transactions conform to the associated standard workflow (see FIGS. 6-A-D). The routing may be performed according to a contract identification field associated with a transaction. The contract identification field may identify a pair of business partners (customer and provider), as well as a standard workflow to be used by the business partners. If a non-conforming transaction is received, for example if a business partner starts a workflow with an "Error" or "Solved" transaction, core transaction system 88 identifies the inconsistency between the transaction and associated standard workflow, sends an error to the sender, and does not pass on the transaction to the recipient.

A service process customer mapping layer 90 is coupled to grid core 80 and to a service process customer workflow callsystem 92. Service process customer workflow callsystem 92 is further coupled to service process customers 40. Service process customer workflow callsystem 92 is capable of generating/retrieving transaction data for identified customer-specific workflows in response to received calls. Customer mapping layer 90 is configured to map multiple service process customer workflows generated by callsystem 92 to corresponding standard service process workflows generated by callsystem 82. The customer-specific workflows may use different sequences of transactions, data structures and transaction syntax than the standard workflows. Each service process customer workflow, including its associated customer-specific transactions and data structures, is mapped to a corresponding service process provider customer workflow through a corresponding standard service process workflow and associated standard transactions and standard data structures. In the customer-to-grid direction, customer mapping layer 90 receives customer-specific workflow identifiers, transactions and data structures, and identifies and/or generates corresponding standard workflow identifiers, transactions and data structures as described below. In the grid-to-customer direction, customer mapping layer 90 receives standard workflow identifiers, transactions and data structures, and identifies and/or generates corresponding customer-specific workflow identifiers, transactions and data structures.

A service process provider mapping layer 94 is coupled to grid core 80 and to a service process provider workflow callsystem 96. Service process provider workflow callsystem 96 is further coupled to service process providers 30. Service process provider workflow callsystem 96 is capable of generating/retrieving transaction data for identified provider-specific workflows in response to received calls. Service process provider mapping layer 94 is configured to map a plurality of service process provider workflows to the plurality of standard service process workflows. Each service process provider workflow, including its associated provider-specific transactions and data structures, is mapped to one service process customer workflow through a corresponding standard service process workflow and associated standard transactions and standard data structures. In the provider-to-grid direction, provider mapping layer 94 receives provider-specific workflow identifiers, transactions and data structures, and identifies and/or generates corresponding standard workflow identifiers, transactions and data structures as described below. In the grid-to-provider direction, provider mapping layer 94 receives standard workflow identifiers, transactions and data structures, and identifies and/or generates corresponding customer-specific workflow identifiers, transactions and data structures.

Exemplary Transaction Mappings

A number of standard workflow transaction maps according to some embodiments of the present invention may be better understood by considering the examples below. A service partner connects its service process to one of the standard workflow maps described below, which in turn is connected to a counterpart service partner's service process. The exemplary workflow maps described below were designed after review of approximately 600 workflow mappings between more than 200 service partners.

If a transaction received from a service partner does not conform to the workflow map being used, an error message is sent to the transaction sender, and the transaction is not forwarded to the intended recipient. In particular, such a transaction is translated to a standard core transaction as described above, and core transaction system (CTS) 88 (FIGS. 5-A-B) identifies the workflow mismatch and sends the error message to the sender.

FIG. 6-A illustrates an exemplary standard customer-initiated workflow with no in-process controlled ownership change transactions, according to some embodiments of the present invention. The middle columns show standard transactions and associated grid status, with the subset of transactions supported by the present standard workflow shown in bold. The workflow begins with a standard customer transaction "Open by Customer", shown in the upper right of FIG. 6-A, and ends a "Closed by Customer" transaction (see upper right quadrant in FIG. 6-A) or "Canceled by Provider" transaction (see lower left quadrant in FIG. 6-A). The check buttons in the "Ownership change" column indicate an ownership transfer to service provider or customer for the corresponding transaction. In response to receiving the "Open by Customer" transaction from the customer, ownership shifts to the service provider, and the service provider initiates a responsive transaction, which may be "Acknowledge by Provider," "Reject by Provider," "Update by Provider," "Process by Provider," "Hold by Provider," "Solved by Provider," "Cancel by Provider," or "Error by Provider." The case ownership stays with the service provider for all transactions except "Solved by Provider," "Canceled by Provider" and "Error by Provider." Keeping ownership with the service provider may result in a service-level-agreement (SLA) clock continuing to run for the service provider. In response to the provider transactions, one or more transactions may be available to the service customer, including "Open by Customer" (in response to a provider error), "Update by Customer" (in response to any provider transaction except "Cancel by Provider"), "Closed by Customer" (in response to a "Solved by Provider" transaction), and "Cancel by Customer" (in response to any provider transaction except an error transaction). As illustrated, not all available standard transaction types are used in the exemplary standard workflow. In particular, in-process ownership-change transactions, denoted as "Assign to provider" in the customer-to-provider direction and "Assign to customer" in the provider-to-customer direction, are not available/supported in the workflow shown in FIG. 6-A.

FIG. 6-B illustrates an exemplary customer-initiated workflow supporting in-process controlled ownership change transactions, according to some embodiments of the present invention. The workflow begins with a standard customer transaction "Open by Customer", shown in the upper right of FIG. 6-B, and ends with a "Closed by Customer" transaction (see upper right quadrant in FIG. 6-B) or "Canceled by Provider" transaction (see lower left quadrant in FIG. 6-B). In response to receiving the "Open by Customer" transaction from the customer, the service provider initiates a responsive transaction, which may be "Acknowledge by Provider," "Reject by Provider," "Update by Provider," "Process by Provider," "Set on Hold by Provider," "Solved by Provider," "Assign to Customer by Provider," "Cancel by Provider," or "Error by Provider." The case ownership stays with the service provider for the transactions "Acknowledge by Provider," "Process by Provider," and "Set on hold by Provider," and switches to the customer for the transactions "Reject by Provider," "Solved by Provider," "Assign to Customer by Provider," "Canceled by Provider" and "Error by Provider." In response to the provider transactions, the one or more transactions may be available to the service customer, including "Acknowledge by Customer", "Reject by Customer," "Update by Customer", "Process by Customer," "Hold by Customer," "Assign to Provider by Customer," "Closed by Customer", and "Error by Customer." In particular, the in-process controlled ownership change transactions "Assign to Customer by Provider" and "Assign to Provider by Customer" transfer ownership of the process, and start/restart or stop/pause a service level agreement (SLA) clock associated with the process.

FIG. 6-C illustrates an exemplary standard provider-initiated workflow without in-process controlled ownership changes, according to some embodiments of the present invention. The workflow begins with a standard provider transaction "Open by Provider," shown in the lower-left quadrant of FIG. 6-C, and ends with a transaction "Closed by Provider," shown in the lower-left quadrant of FIG. 6-C. The workflow ownership remains with the service provider for all transactions except an "Error by Provider" transaction, which results in an ownership transfer to the service customer.

FIG. 6-D illustrates an exemplary standard provider-initiated workflow supporting in-process controlled ownership change transactions according to some embodiments of the present invention. The workflow begins with a standard provider transaction "Open Info. by Provider," shown in the lower-left quadrant of FIG. 6-D, and ends with a transaction "Closed by Provider," shown in the lower-left quadrant of FIG. 6-D, or a transaction "Closed by Customer," shown in the upper-right quadrant of FIG. 6-D. The case ownership is transferred to the service customer in response to a number of provider transactions, and in particular in response to the in-process controlled ownership transfer transaction "Assign to Customer by Provider." Similarly, the in-process controlled ownership transfer transaction "Assign to Provider by Customer" allows the service customer to transfer ownership of the service process to the service provider.

Exemplary Grid Data Maps

Table 2 above lists a number of exemplary data field groups according to some embodiments of the present invention. In some embodiments, a set of data maps indicate a presence status for each field and each standard transaction type.

FIG. 7-A shows an exemplary data map in a relatively simple embodiment illustrating transaction types used for proper case routing, for data fields in Identification, Text, Service Contract and Status field groups (see Table 2) and several standard transaction types. The notation M indicates that the data field is mandatory for that transaction type, the notation O indicates that the data field is optional for that transaction type, and a blank cell indicates that the data field is not used for that transaction.

FIG. 7-B shows an exemplary data map for a number of transaction types used for service request (case) management according to some embodiments of the present invention. The illustrated data map includes a status for a number of fields characterizing the person acting on each side (provider/customer).

FIG. 7-C shows an exemplary data map for a number of transaction types used for incident management referencing a configuration item, according to some embodiments of the present invention. Data map fields include identification data and location data for a physical component relevant to the incident.

Exemplary Use Cases

In some embodiments, a service process integration grid as described above may be used to establish 1 to N, M to 1, or N to M connections between service process customers and service process providers. FIG. 8-A illustrates an exemplary configuration in which one service process customer 40 is connected to multiple service process customers 30 through service process integration grid 80. FIG. 8-B illustrates an exemplary configuration in which one service process provider 30 is connected to multiple service process customers 40 through grid 80. FIG. 8-C illustrates an exemplary configuration in which multiple service process customers 40 are connected to multiple service process providers 30 through grid 80. Some service providers and/or customers may use standardized service portals 31, 41, rather than partner-specific ITSM applications, to connect to service grid 20. Service portals 31, 41 may include web-based online interfaces embedded in a SolveDirect application, provided by the operator of service grid 20, which provide standardized functionality of an ITSM application. Such functionality may allow service providers and customers to create new service cases, update service cases, and track service cases.

Exemplary Partner On-Boarding Process

In some embodiments, a process used to on-board a new service partner (service process provider or customer) includes: identifying the roles, transactions, and call codes used to send the receive updates from the partner's ITSM application; identifying the data structure of each transaction and mapping it to a corresponding standard core data structure (described above); identifying the transport protocol used to send and receive data from the partner's ITSM application; preparing a set of basic data settings and set up the partner's account with the grid; and performing a partner customization including creating one or more standard workflows for the partner as described above, and defining contract parameters for the partner connection to the grid.

In some embodiments, a set-up process for a new service partner includes: creating a company account on the grid, and setting up an associated role (customer or provider) and permissions; creating a new callsystem for the partner; creating a new organization, setting up an associated role for the organization, and referencing the call system to the organization; creating one or more user accounts; and creating a contract. If the partner organization role is service customer, the partner organization is selected as service customer in the contract, and a standard grid organization Core_Prov is selected as service provider. The same standard grid organization is selected for multiple service customers. If the partner organization role is service provider, the partner organization is selected as service provider in the contract, and a standard grid organization Core_Cust is selected as service provider. The same standard grid organization is selected for multiple service providers. In some embodiments, a set-up process for an existing service partner skips the initial steps described above, and proceeds directly to creating a contract.

In some embodiments, the partner customization includes naming the call system created during the set-up process, creating a possible call system mapping for a call system definition corresponding to selected contract settings, and creating customer-specific call codes for priorities, severities, problem types, and/or failure types. Connecting the partner's ITSM application to the corresponding service grid workflow/callsystem may include creating a user for the communication, creating inbound and outbound triggers, creating inbound and outbound communications and setting the sender and receiver, creating XSLT templates for inbound and outbound communications, and creating internal triggers for failure handling. Connecting to the core may include mapping the partner's call states to the standard core callsystem call states/transactions, mapping the partner's call codes the standard core callsystem call states/transactions, checking that the partner's contract settings have been configured correctly, and creating a contract element.

CONCLUSION

In some embodiments, the described systems and methods allow connecting a larger number of service partners using a central hub as an IPaaS (Integration Platform as a Service) between service partners and their heterogeneous service processes.

In some embodiments, process integration between companies using different ITSM applications may be executed within hours or days. A relatively fast integration is made possible in part by exemplary standardized components (workflows, transactions, data structures) described herein, which were designed as a result of experience and analysis of hundreds of real-world integration projects. In one review, over 600 workflow mappings between more than 200 service partners were analyzed.

In particular, in some embodiments, systems and methods as described may allow integrating a first service partner with 20 person-days or fewer of effort, with subsequent partners being integrated with 5 person days or fewer of effort per partner. Additional reductions in the time and expense of integration are achievable. Such reductions are particularly important for service partners (e.g. service providers) who plan to connect to large numbers (e.g. hundreds) of service partners within short time frames, e.g. a few months. By contrast, in an analysis of service process integration using an approach that did not employ standardized workflows, transactions and data structures as described below, integrating two new partners was observed to take an average of 45 person-days of effort.

It will be clear to one skilled in the art that the above embodiments may be altered in many ways without departing from the scope of the invention. Accordingly, the scope of the invention should be determined by the following claims and their legal equivalents.

What is claimed is:

1. A computer system including at least one processor configured to execute instructions to form:
   a service process provider mapping layer configured to map a plurality of heterogeneous service process provider workflows of a plurality of service process provider information technology service management applications to a plurality of standard service process workflows of a service process integration grid, wherein each service process provider workflow is mapped to one standard service process workflow, and wherein the plurality of standard service process workflows comprises a class of customer-initiated standard service process workflows, and a class of provider-initiated standard service process workflows;
   a service process customer mapping layer configured to map a plurality of heterogeneous service process customer workflows of a plurality of service process customer information technology service management applications to the plurality of standard service process workflows, wherein each service process customer workflow is mapped to one standard service process workflow; and
   a service process integration grid core coupling the service process provider mapping layer to the service process customer mapping layer, the service process integration grid core being configured to route service process workflow transactions between service process providers and corresponding service process customers, wherein the service process integration grid core couples each service process customer workflow to a corresponding service process provider workflow through a corresponding standard service process workflow.

2. The system of claim 1, wherein the plurality of standard service process workflows comprises a class of standard service process workflows supporting assign-to-partner transactions, and a class of standard service process workflows not supporting assign-to-partner transactions, wherein assign-to-partner transactions transfer service process ownership between service process provider and corresponding customer.

3. The system of claim 1, wherein the plurality of standard service process workflows comprises:
   a customer-initiated standard service process workflow supporting assign-to-partner transactions,
   a customer-initiated standard service process workflow not supporting assign-to-partner transactions,
   a provider-initiated standard service process workflow supporting assign-to-partner transactions, and
   a provider-initiated standard service process workflow not supporting assign-to-partner transactions.

4. The system of claim 1, wherein:
   the service process provider mapping layer is configured to map a plurality of service process provider transaction types to a plurality of standard service process transaction types supported by the service process integration grid core, each service process provider transaction type being mapped to one standard service process transaction type; and
   the customer mapping layer is configured to map a plurality of service process customer transaction types to the plurality of standard service process transaction types, wherein each service process customer transaction types is mapped to a corresponding service process provider transaction type through a corresponding standard service process transaction type.

5. The system of claim 1, wherein:
   the service process provider mapping layer is configured to map a plurality of service process provider data structures to a plurality of standard service process data structures supported by the service process integration core, each service process provider data structure being mapped to one standard service process data structure; and
   the customer mapping layer is configured to map a plurality of service process customer data structures to the plurality of standard service process data structures, wherein each service process customer data structures is mapped to a corresponding service process provider data structure through a corresponding standard service process data structure.

6. The system of claim 5, wherein the service process integration grid core is configured to route service process workflow transactions between a service process provider and a corresponding service process customer according to a standard service process data structure contract identification field, the contract identification field identifying a service contract between the service process provider and service process customer.

7. The system of claim 1, wherein each of the plurality of standard service process workflows is selected from a group consisting of incident management, problem management, and service request management workflows.

8. A computer-implemented method comprising employing at least one processor to execute instructions to:
   map a plurality of heterogeneous service process provider workflows of a plurality of service process provider information technology service management applications to a plurality of standard service process workflows of a service process integration grid, wherein each service process provider workflow is mapped to one standard service process workflow, and wherein the plurality of standard service process workflows comprises a class of customer-initiated standard service process workflows, and a class of provider-initiated standard service process workflows;
   map a plurality of heterogeneous service process customer workflows of a plurality of service process customer information technology service management applications to the plurality of standard service process workflows, wherein each service process customer workflow is mapped to one standard service process workflow; and
   employ a service process integration grid core to route service process workflow transactions between service process providers and corresponding service process customers, wherein the service process integration grid core couples each service process customer workflow to a corresponding service process provider workflow through a corresponding standard service process workflow.

9. The method of claim 8, wherein the plurality of standard service process workflows comprises a class of standard service process workflows supporting assign-to-partner transactions, and a class of standard service process workflows not supporting assign-to-partner transactions, wherein assign-to-partner transactions transfer service process ownership between service process provider and corresponding customer.

10. The method of claim 8, wherein the plurality of standard service process workflows comprises:

a customer-initiated standard service process workflow supporting assign-to-partner transactions, a customer-initiated standard service process workflow not supporting assign-to-partner transactions, a provider-initiated standard service process workflow supporting assign-to-partner transactions, and a provider-initiated standard service process workflow not supporting assign-to-partner transactions.

11. The method of claim 8, further comprising employing the at least one processor to execute instructions to:

map a plurality of service process provider transaction types to a plurality of standard service process transaction types supported by the service process integration grid core, each service process provider transaction type being mapped to one standard service process transaction type; and map a plurality of service process customer transaction types to the plurality of standard service process transaction types, wherein each service process customer transaction types is mapped to a corresponding service process provider transaction type through a corresponding standard service process transaction type.

12. The method of claim 8, further comprising employing the at least one processor to execute instructions to:

map a plurality of service process provider data structures to a plurality of standard service process data structures supported by the service process integration core, each service process provider data structure being mapped to one standard service process data structure; and map a plurality of service process customer data structures to the plurality of standard service process data structures, wherein each service process customer data structures is mapped to a corresponding service process provider data structure through a corresponding standard service process data structure.

13. The method of claim 12, further comprising employing the at least one processor to execute instructions to route service process workflow transactions between a service process provider and a corresponding service process customer according to a standard service process data structure contract identification field, the contract identification field identifying a service contract between the service process provider and service process customer.

14. The method of claim 8, wherein each of the plurality of standard service process workflows is selected from a group consisting of incident management, problem management, and service request management workflows.

15. A non-transitory computer-readable medium encoding instructions which, when executed by a computer system, cause the computer system to:

map a plurality of heterogeneous service process provider workflows of a plurality of service process provider information technology service management applications to a plurality of standard service process workflows of a service process integration grid, wherein each service process provider workflow is mapped to one standard service process workflow, and wherein the plurality of standard service process workflows comprises a class of customer-initiated standard service process workflows, and a class of provider-initiated standard service process workflows;

map a plurality of heterogeneous service process customer workflows of a plurality of service process customer information technology service management applications to the plurality of standard service process workflows, wherein each service process customer workflow is mapped to one standard service process workflow; and employ a service process integration grid core to route service process workflow transactions between service process providers and corresponding service process customers, wherein the service process integration grid core couples each service process customer workflow to a corresponding service process provider workflow through a corresponding standard service process workflow.

16. The computer readable medium of claim 15, wherein the plurality of standard service process workflows comprises a class of standard service process workflows supporting assign-to-partner transactions, and a class of standard service process workflows not supporting assign-to-partner transactions, wherein assign-to-partner transactions transfer service process ownership between service process provider and corresponding customer.

17. The computer readable medium of claim 15, wherein the plurality of standard service process workflows comprises:

a customer-initiated standard service process workflow supporting assign-to-partner transactions, a customer-initiated standard service process workflow not supporting assign-to-partner transactions, a provider-initiated standard service process workflow supporting assign-to-partner transactions, and a provider-initiated standard service process workflow not supporting assign-to-partner transactions.

18. The computer readable medium of claim 15, further encoding instructions which, when executed by the computer system, cause the computer system to:

map a plurality of service process provider transaction types to a plurality of standard service process transaction types supported by the service process integration grid core, each service process provider transaction type being mapped to one standard service process transaction type; and map a plurality of service process customer transaction types to the plurality of standard service process transaction types, wherein each service process customer transaction types is mapped to a corresponding service process provider transaction type through a corresponding standard service process transaction type.

19. The computer readable medium of claim 15, further encoding instructions which, when executed by the computer system, cause the computer system to:

map a plurality of service process provider data structures to a plurality of standard service process data structures supported by the service process integration core, each service process provider data structure being mapped to one standard service process data structure; and map a plurality of service process customer data structures to the plurality of standard service process data structures, wherein each service process customer data structures is mapped to a corresponding service process provider data structure through a corresponding standard service process data structure.

20. The computer readable medium of claim 19, further encoding instructions which, when executed by the computer system, cause the computer system to route service process workflow transactions between a service process provider and a corresponding service process customer according to a standard service process data structure contract identification field, the contract identification field identifying a service contract between the service process provider and service process customer.

21. The computer readable medium of claim 15, wherein each of the plurality of standard service process workflows is selected from a group consisting of incident management, problem management, and service request management workflows.

* * * * *